(12) United States Patent
Schuster et al.

(10) Patent No.: US 10,911,519 B2
(45) Date of Patent: Feb. 2, 2021

(54) MEDIA DISTRIBUTION SYSTEM WITH TICKER FEED

(71) Applicant: iHeartMedia Management Services, Inc., San Antonio, TX (US)

(72) Inventors: Bobbi D. Schuster, San Antonio, TX (US); Kohinoor Basu, Aliso Viejo, CA (US); Matthew M. Ferry, Eastvale, CA (US); David C. Jellison, Jr., Ogallala, NE (US); Steven Gable, McKinney, TX (US); David R. Murray, Windemere, FL (US)

(73) Assignee: iHeartMedia Management Services, Inc., San Antonio, TX (US)

( * ) Notice: Subject to any disclaimer, the term of this patent is extended or adjusted under 35 U.S.C. 154(b) by 0 days.

(21) Appl. No.: 16/444,034

(22) Filed: Jun. 18, 2019

(65) Prior Publication Data

US 2019/0327290 A1 Oct. 24, 2019

Related U.S. Application Data

(63) Continuation of application No. 13/541,023, filed on Jul. 3, 2012, now Pat. No. 10,348,803, which is a
(Continued)

(51) Int. Cl.
*H04L 29/08* (2006.01)
*H04L 29/06* (2006.01)
(Continued)

(52) U.S. Cl.
CPC ............ *H04L 67/06* (2013.01); *G06Q 20/14* (2013.01); *G06Q 30/02* (2013.01);
(Continued)

(58) Field of Classification Search
CPC ... H04L 67/06; H04L 67/2804; H04L 65/602; H04L 67/20; H04L 63/10;
(Continued)

(56) References Cited

U.S. PATENT DOCUMENTS 6,985,882 B1 1/2006 Del Sesto
7,568,209 B1 7/2009 Addington et al.
(Continued)

*Primary Examiner* — Anthony Bantamoi
(74) *Attorney, Agent, or Firm* — Garlick & Markison; Edward J. Marshall

(57) ABSTRACT

A method for use in a media distribution system includes receiving media content at an enterprise hub from a plurality of media outlets via a communication network. The method continues by assigning a unique identifier to the media content. The method continues by receiving at the enterprise hub, from the plurality of media outlets via a communication network, a record of broadcast of the media content on a continuous ticker feed and analyzing the continuous ticker feed to detect the unique identifier. The method continues by automatically verifying if the media content broadcast as scheduled and classifying the media content broadcast. The method continues by generating and transmitting to at least a provider of the media content, from the plurality of media outlets, a displayable report of the classification of the media content broadcast.

20 Claims, 4 Drawing Sheets

Related U.S. Application Data continuation of application No. 12/382,634, filed on Mar. 19, 2009, now Pat. No. 8,230,460.

(60) Provisional application No. 61/064,665, filed on Mar. 19, 2008, provisional application No. 61/193,218, filed on Nov. 6, 2008.

(51) Int. Cl.

| | |
|---|---|
| *H04H 60/06* | (2008.01) |
| *G06Q 30/02* | (2012.01) |
| *G06Q 20/14* | (2012.01) |
| *H04H 60/27* | (2008.01) |

(52) U.S. Cl.
CPC ..... *G06Q 30/0241* (2013.01); *G06Q 30/0253* (2013.01); *G06Q 30/0264* (2013.01); *G06Q 30/0283* (2013.01); *H04H 60/06* (2013.01); *H04H 60/27* (2013.01); *H04L 29/06027* (2013.01); *H04L 63/10* (2013.01); *H04L 65/602* (2013.01); *H04L 67/20* (2013.01); *H04L 67/2804* (2013.01)

(58) Field of Classification Search
CPC .............. H04L 29/06027; G06Q 20/14; G06Q 30/0264; G06Q 30/02; G06Q 30/0241; G06Q 30/0253; G06Q 30/0283; G06Q 30/028; H04H 60/27; H04H 60/06
See application file for complete search history.

(56) References Cited

U.S. PATENT DOCUMENTS

| | | |
|---|---|---|
| 8,230,460 B2 | 7/2012 | Schuster et al. |
| 2002/0083444 A1 | 6/2002 | Blasko et al. |
| 2003/0070167 A1 | 4/2003 | Holtz et al. |
| 2004/0025176 A1 | 2/2004 | Franklin et al. |
| 2005/0171897 A1 | 8/2005 | Forsythe et al. |
| 2006/0253323 A1 | 11/2006 | Phan et al. |
| 2007/0162926 A1 | 7/2007 | Steelberg et al. |
| 2008/0250445 A1* | 10/2008 | Zigmond ................ H04N 7/10 |
| 2009/0044217 A1* | 2/2009 | Luterbach ............... H04N 7/10 |

* cited by examiner

MEDIA DISTRIBUTION SYSTEM WITH TICKER FEED

CROSS-REFERENCE TO RELATED APPLICATIONS

The present U.S. Utility Patent Application claims priority pursuant to 35 U.S.C. § 120 as a continuation of U.S. Utility application Ser. No. 13/541,023, entitled "Real-Time Insertion and Reporting of Media Content," filed Jul. 3, 2012, which is a continuation of U.S. Utility application Ser. No. 12/382,634, entitled "Real-Time Insertion and Reporting of Media Content," filed Mar. 19, 2009, now U.S. Pat. No. 8,230,460, which claims the priority of U.S. Provisional Application No. 61/064,665, entitled "System and Method for Integrated, Automated Inventory Management and Advertisement Delivery," filed Mar. 19, 2008 and U.S. Provisional Application No. 61/193,218, entitled "System and Method for Integrated, Automated Inventory Management and Advertisement Delivery," filed Nov. 6, 2008, which are hereby incorporated herein by reference in their entirety and made part of the present U.S. Utility Patent Application for all purposes.

This application also incorporates by reference in their entirety U.S. Utility application Ser. No. 12/382,635 entitled "Automated Content Delivery to Distributed Media Outlets," and U.S. Utility application Ser. No. 12/382,636 entitled "Automated Quote Generation and Advertising Buy Placements," both of which were filed on Mar. 19, 2009.

TECHNOLOGICAL FIELD

The relevant technological field is media content scheduling and delivery.

BACKGROUND

Radio station systems for delivering advertising and other media content inventory are primarily disconnected and locally operated. Network originated programming and commercial advertising content is usually distributed manually and inefficiently to local media outlets. For example, local media outlets typically either receive a fax, e-mail, or manually visit a website to acquire instructions and content from a network or other media content provider. The visits are typically are repeated in a manually-intensive manner often on a daily basis. These repetitive manual processes are inefficient, require a trained staff and are error prone.

Arrangements that provide solutions to the described problems are less than perfect. The few systems that are integrated are connected only locally or in some cases regionally. None of these systems provide an enterprise-wide or nation-wide connection of distributed media outlets. Further, traditional systems offer little in the way of automation, extensibility and near time placement of advertising or other media content across multiple regions. Traditional systems do not enable media content providers to select available spots from nationally distributed media outlets, automatically upload and transmit content to distributed media outlets and receive an automated verification of the broadcast of the media content.

SUMMARY

In some embodiments a method is disclosed. The method can include receiving a plurality of unperfected logs via a network. In some embodiments, each unperfected log is associated with a media outlet and can indicate available advertising inventory of the media outlet and an anticipated broadcast schedule of the media outlet. The method can store the plurality of unperfected logs in a database based on the anticipated broadcast schedule. In some embodiments, the database is part of an electronic hub that is operatively coupled to the network. The method can include transmitting at least one unperfected log from the plurality of unperfected logs by the electronic hub and receiving an inquiry into one or more spots in the available inventory by the electronic hub. The transmitted at least one unperfected log associated with a selected media outlet. Embodiments of the method can transmit data associated with the one or more spots the data to be displayed on a graphical user interface in response to the inquiry, receive a selection of one or more spots in the available inventory in response to the transmitted data, and request content related to the selected one or more spots. The method can further include receiving advertising content, associating the advertising content with the selection of the one or more spots, and creating a perfected log based on the unperfected log and the received advertising content. Embodiments of the method monitor a broadcast of the selected media outlet, detect a difference between the perfected log and the broadcast, and transmit status information based on a difference between the second log and the broadcast.

In some embodiments a system is disclosed. The system can include a processor. The processor can be operatively coupled to a network and a database. The processor can receive a plurality of unperfected logs of anticipated broadcasting schedules. In embodiments, the unperfected logs can include available inventory associated with a plurality of remote media outlets a portion of the available inventory indicated as reserved inventory. The processor can store the plurality of unperfected logs in the database based on the anticipated broadcast schedule, transmit at least one unperfected log from the plurality of unperfected logs, and receive an inquiry into one or more spots in the available inventory. The transmitted at least one unperfected log is associated with a selected media outlet. The processor can transmit data associated with the one or more spots the data to be displayed on a graphical user interface in response to the inquiry, receive a selection of one or more spots in the available inventory in response to the transmitted data, and request content related to the selected one or more spots. In embodiments, the processor can receive advertising content, associate the advertising content with the selection of the one or more spots, and create a perfected log based on the unperfected log and the received advertising content. The processor can monitor a broadcast of the selected media outlet, detect a difference between the perfected log and the broadcast, and transmit status information based on a difference between the perfected log and the broadcast.

In yet another embodiment a computer readable medium is disclosed. The medium can be a computer program product embodied as computer usable program code. The computer usable program code can be configured to receive a plurality of unperfected logs of anticipated broadcasting schedules. The unperfected logs can include available inventory associated with a plurality of remote media outlets a portion of the available inventory indicated as reserved inventory. The code when executed can cause the computer to store the plurality of unperfected logs in a database based on the anticipated broadcast schedule, transmit at least one unperfected log from the plurality of unperfected logs, and receive an inquiry into one or more spots in the available inventory. The transmitted at least one unperfected log can be associated with a selected media outlet. The code when executed can transmit data associated with the one or more spots the data to be displayed on a graphical user interface in response to the inquiry, receive a selection of one or more spots in the available inventory in response to the transmitted data, and request content related to the selected one or more spots. In some embodiments, the code when executed can receive advertising content, associate the advertising content with the selection of the one or more spots, and create a perfected log based on the unperfected log and the received advertising content. The code when executed can monitor a broadcast of the selected media outlet, detect a difference between the perfected log and the broadcast, and transmit status information based on a difference between the perfected log and the broadcast.

DESCRIPTION OF THE DRAWINGS

The detailed description will refer to the following drawings, wherein like numerals refer to like elements, and wherein.

DETAILED DESCRIPTION

The terminology utilized herein is for the purpose of describing particular embodiments only and is not intended to be limiting of the claims. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In some embodiments a method that receives a plurality of unperfected logs via a network is disclosed. The methods and systems herein can be referred to as an integrated media content distribution system. In some embodiments, each unperfected log is associated with a media outlet and can indicate available advertising inventory of the media outlet and an anticipated broadcast schedule of the media outlet. The method can store the plurality of unperfected logs in a database based on the anticipated broadcast schedule. In some embodiments, the database is part of an electronic hub that is operatively coupled to the network. The method can include transmitting at least one unperfected log from the plurality of unperfected logs by the electronic hub and receiving an inquiry into one or more spots in the available inventory by the electronic hub. The transmitted at least one unperfected log associated with a selected media outlet. Embodiments of the method can transmit data associated with the one or more spots the data to be displayed on a graphical user interface in response to the inquiry, receive a selection of one or more spots in the available inventory in response to the transmitted data, and request content related to the selected one or more spots. The method can further include receiving advertising content, associating the advertising content with the selection of the one or more spots, and creating a perfected log based on the unperfected log and the received advertising content. Embodiments of the method monitor a broadcast of the selected media outlet, detect a difference between the perfected log and the broadcast, and transmit status information based on a difference between the second log and the broadcast.

The term broadcast as utilized herein should be given a broad and expansive meaning to include any form of transmission or distribution of content to the public. The term broadcast should also include without limitation transmission or distribution via terrestrial radio, satellite radio, Internet radio, television, satellite television, Internet transmissions and the like. Broadcasting as utilized herein also encompasses unicasting, multicasting, pod casting and all formats of Internet communications.

Figure 1:
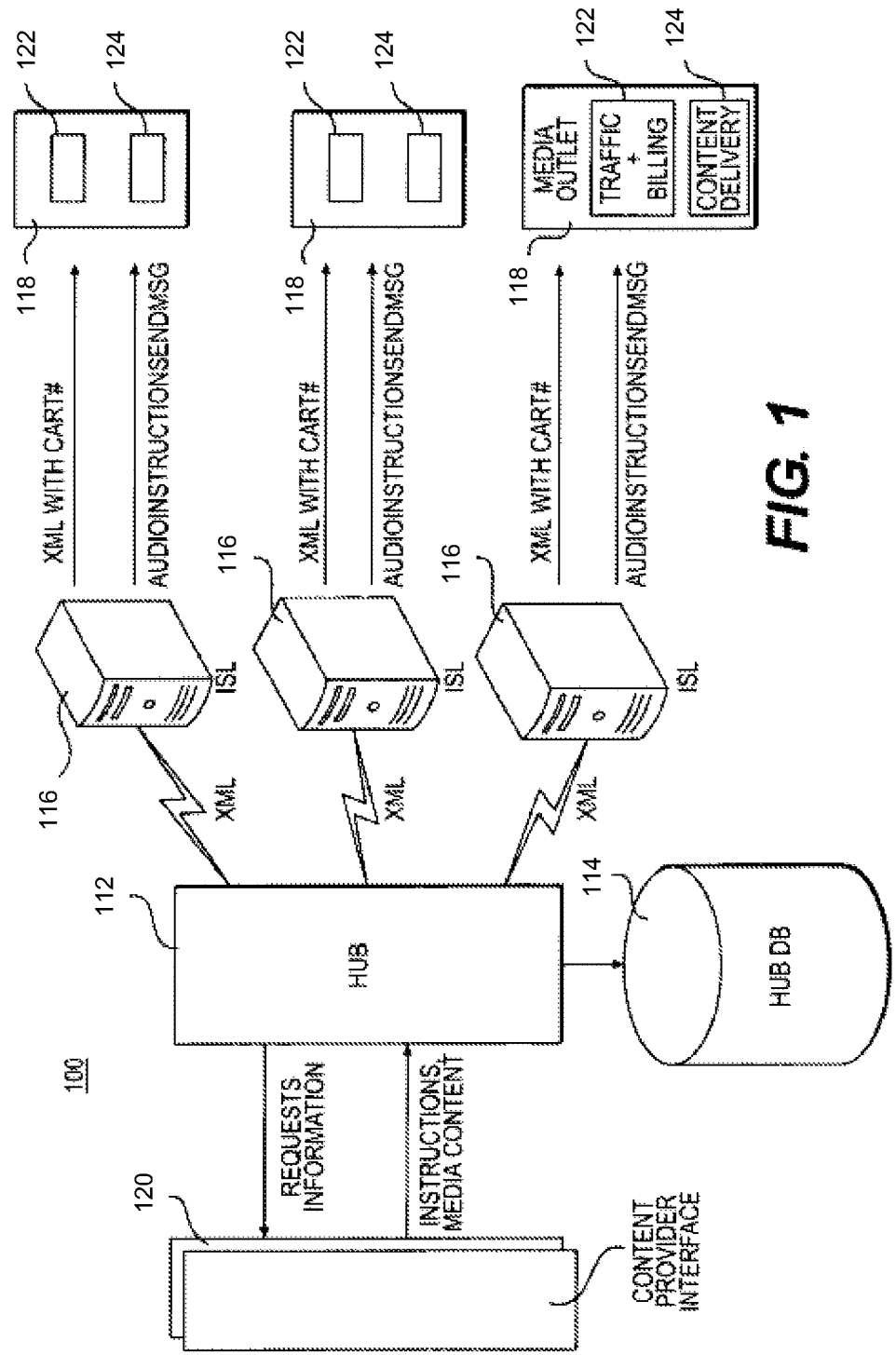
FIG. 1 is a block diagram of components that can facilitate real-time insertion and reporting of media content.

Referring to FIG. 1 a block diagram of an integrated media content distribution system 100 is depicted. The components of the system 100 can be utilized to facilitate performing the methods described herein. In some embodiments system 100 can enable the automated delivery of media content from media content providers to distributed media outlets who can broadcast the media content. Media content, as used herein, should be given its broadest meaning encompassing any form of media content that may be broadcast, including without limitation, advertising spots, including both audio and/or video advertising and audio and/or video programming, such as live and recorded talk shows, events, such as sports events, to name a few.

System 100 can include enterprise hub 112, enterprise hub database 114, one or more integrated services layers (ISLs) 116, distributed media outlets 118 and media content provider interface 120. Distributed media outlets 118, as used herein, can encompass local media outlets (e.g., local radio and television stations) that may be distributed in multiple markets, an entire market of local media outlets (e.g., all of the radio or television stations in a particular city), regional media outlets (e.g., regional radio and television stations), national media outlets, and media outlets that broadcast via the Internet or satellite, and combinations thereof. Distributed media outlets 118 may include transaction delivery systems such as traffic and billing systems 122 and media delivery systems 124. The transaction delivery systems may each serve single media outlets or multiple media outlets. Likewise, a media outlet may be served by multiple transaction delivery systems. For example, each local media outlet may have a transaction delivery system (i.e., traffic and billing system 122 and media delivery system 124), an entire market of local media outlets may share a transaction delivery system or other combinations of distributed media outlets may share a transaction delivery system. Likewise, a media outlet may be served by multiple transaction delivery systems.

Enterprise hub 112 can transmit and receive messages, instructions, media content, programming logs or any information that the public may be interested in. Enterprise hub 112 can communicate with media content provider interface 120 and, through ISLs 116, can communicate with distributed media outlets 118. Enterprise hub 112 can be an aggregation layer for ISLs 116 and for media content provider interface 120, thereby interconnecting media content providers with distributed media outlets 118. Enterprise hub 112 can include a web service with one or more servers that are connected to a network. The enterprise hub 112 can store instructions and programming code that is executed by one or more servers.

In some embodiments a processor, as part of the enterprise hub 112, can be adapted to request media content from a media provider via the network and can be adapted to receive the media content and instructions from the media content and in response to the instructions can broadcast the media content. The enterprise hub can also store the received media content in the database 114, process the instructions and distribute the media content and the instructions to distributed media outlets. In some embodiments that enterprise hub 112 can receive information indicating if the media content was broadcast by the distributed media outlets substantially in accordance with the instructions. In some embodiments, the processor can automatically distribute the media content in response to processing the instructions and the processor can instruct the distributed media outlets on the desired parameters for broadcasting the media content. Enterprise hub 112 may provide data, media and instruction to media content provider interface 120, possibly in the form of web sites or webpages, and such data can be accessed by media content providers, via media content provider workstations. Allowing such access allows for a user to make selections and input information to the system. Many different network components can be connected to enterprise hub 112 via the network. Network could be any kind of network such as a virtual private network, a local area network or a wide area network such as the Internet.

In some embodiments enterprise hub database 114 can store various information, as controlled by enterprise hub 112. For example, enterprise hub database 114 can store messages, instructions and media content received from media content providers (e.g., from media content provider interface 120) under the control of hub 112. Enterprise hub database 114 may store unique identifiers assigned to each media content provider. Therefore, each media content provider can have an ID, that is, a unique identifier that is assigned to a specific media outlet. The media outlet can be a station identifier (ID), and other unique identifiers can also be assigned to media content. One such identifier can be a Cart number or identifier. These unique identifiers may be generated by enterprise hub 112 or other components of system 100 or by a remote system not shown. Enterprise hub database 114 can also store configuration data for each media content provider interface. The configuration data can be generated by enterprise hub 112. Enterprise hub database 114 can be maintained by a server as part of the enterprise hub 112 or as a part of a separate database server.

Media content provider interface 120 can be an outward looking electronic interface to media content provider that can select media outlets and markets by submitting instructions for broadcasting of media content. Interface 120 can also provide media content, and can facilitate review and proofing of broadcast performance. Media content providers can include entities that provide media content. Such entities can include programming and advertising for broadcasting on media outlets 118. Media content providers may be entities that act as advertisers, advertising agencies, advertising brokers, or any one or entity that is in the business of advertising. Media content providers can be enterprise partners in a partnership agreement or can be other entities that sell advertising on a national or regional level where the advertisers desire to place advertising content on distributed media outlets, such as local or regional radio stations. In some embodiments, advertising time spots (avails) that are not sold nationally by media content providers can be marked as available to the local media outlet to sell to local advertisers. Media content providers may also be enterprise partners or other media companies that own media content, such as syndicated radio or television programs, and want to broadcast this media content via multiple distributed media outlets.

Media content providers may also be direct advertisers (e.g., Fortune 50 companies) that want to directly control, place and broadcast advertising with multiple distributed media outlets. Some embodiments of media content provider interface 120 may include a graphical user interface that presents information to media content provider users and allows the media content provider users to view, enter and select information, including instructions for broadcasting the media content. Media content provider interface 120 may also include an associated file transfer protocol (FTP) site that enables the transfer of files, including media content files and instructions, to enterprise hub 112. Enterprise hub 112 may automatically request and receive files from media content provider FTP site. The enterprise hub 12 can connect to media content provider interface 120 via the Internet.

Only one media content provider is illustrated however system 100 may include a plurality of media content provider interfaces 120. In some embodiments there could be many different media content providers, both internal and external to the enterprise system where the providers can access and utilize the features of the system 100 and the enterprise hub 112. Enterprise hub 112 may provide customized media content provider interfaces 120 for each different media content provider or it may provide a uniform media content provider interface 120 to one, all or many of the media content providers.

ISLs 116 can serve as multidirectional gateways to inject, extract, organize and route messages and media content between distributed media outlets 118 and enterprise hub 112. Various transactions or communications between system 100 components can be facilitated by ISLs 116. For example, communications regarding instructions, media content, scheduling logs, preemptions, schedule availability claims, and streams of information indicating what is currently being played on a distributed media outlet can all be facilitated by ISLs 116. Further communications regarding whether media content has been played as scheduled (e.g., "now playing" data), identifications of media outlets or stations, product codes, industry codes and status updates that are generated and sent by transaction delivery systems of distributed media outlets 118 can be communicated among ISLs 116 enterprise hub 112 and distributed media outlets 118.

In some embodiments messages in an extensible mark up language (XML) can be utilized in communications between ISLs 116 and enterprise hub 112. These XML messages can include a Cart number that identifies media content presented for broadcast. The XML messages can also include media content broadcast instruction messages that can be sent between ISLs 116 and distributed media outlets 118. In some embodiments, there may be one ISL 116 for each distributed media outlet 118. In other embodiments ISLs 116 can service multiple distributed media outlets 118 and there may be redundancy of ISLs 116 (multiple ISLs 116 serving same distributed media outlet 118). Such a configuration can provide redundancy, fail safe and backup features that can enhance system robustness. ISLs 116 may also be located at distributed media outlets 118. ISLs 116 may be incorporated into distributed media outlet 118 systems, such as transaction delivery systems.

Distributed media outlets 118 can be embodied as radio stations, television stations, an Internet server and any media outlet that can broadcast content. Distributed media outlets 118 may serve one or more local, national or regional markets. Distributed media outlets 118 can include transaction delivery systems that may include traffic and billing systems 122 and media (e.g., audio) delivery systems 124. Traffic and billing systems 122 may handle orders (e.g., instructions for broadcasting media content, such as advertising) and billing for fulfillment of such orders. Media delivery systems 124 may handle the playing of the media content.

Figure 2:
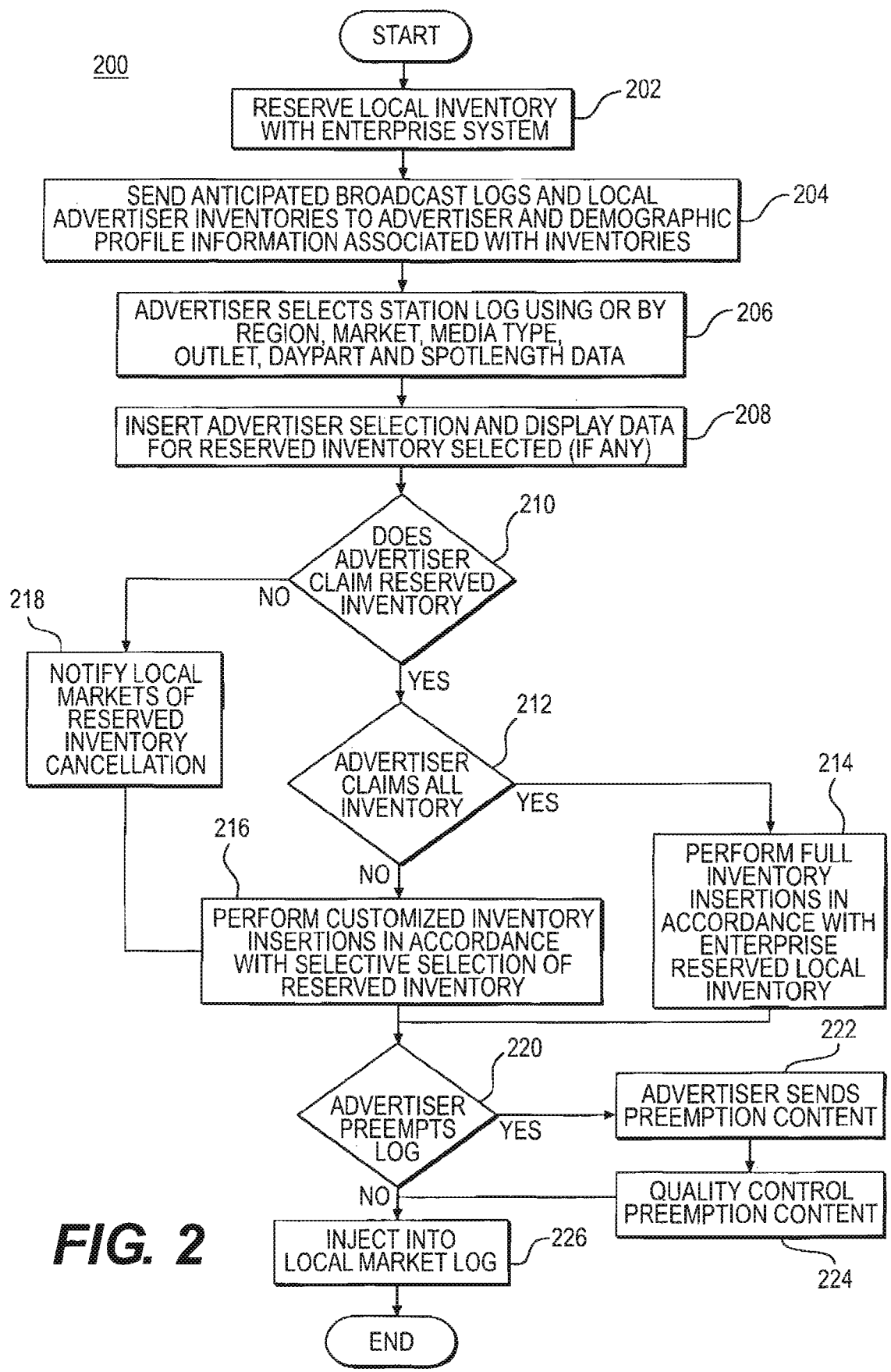
FIG. 2 is a flow diagram for real-time insertion and reporting of media content.

Referring now to FIG. 2, a flowchart is provided that illustrates a method 200 for real-time insertion and reporting of media content. In operation a media content provider can reserve inventory with one or more distributed media outlets, as illustrated in block 202. As shown the distributed media outlets may be local media outlets. The media content provider can reserve the inventory via media content provider interface using system 100. In embodiments, the inventory can be available advertising inventory or spots of the media outlet that can be reserved by the distributed media outlet for placing advertisements.

The enterprise hub can receive, from one or more distributed media outlets, one or more anticipated broadcast logs. The anticipated broadcast logs can be unperfected logs of one or more media outlet's anticipated broadcast schedules. These unperfected logs, along with media outlet inventories, can be stored in enterprise hub database and sent by the enterprise hub to the media content provider, as illustrated in block 204. The unperfected logs may include demographic profile information associated with the inventories. This demographic profile information may include demographic information describing the anticipated audience.

The media content provider can select an unperfected log of one or more distributed media outlets, as illustrated by block 206. The media content provider selection may be made based on region, market, media type, media outlet, daypart and spotlength data. This data may be provided to media content provider via media content provider interface. The distributed media outlets may be displayed on, and the selection can be made using, the media content provider interface. The selection may be made as in inquiry into one or more spots in the available inventory. The enterprise hub can receive the media content provider selection and transmit data associated with the one or more spots for display on the provider interface. The media content provider selection may be made prior to sending unperfected logs to the media content provider. Indeed, the unperfected log or logs sent to the media content provider may be sent based on the selection.

The media content provider can select the one or more spots of available inventory in response to the data transmitted by the enterprise hub and displayed on the provider interface. The enterprise hub can receive the media content provider selection and display data corresponding to the selection, as illustrated by block 208. The selection may be inserted into one or more media outlet logs.

The method 200 can determine if the media content provider claims any of the reserved inventory, as illustrated by block 210, and if the media content provide claims all of the reserved inventory, as illustrated by block 212. In some embodiments, the enterprise hub can perform these actions. If the media content provider claims the reserved inventory, the enterprise hub and the ISLs can insert the media content into the reserved inventory, as illustrated by block 214. If the media content provider claims some of the reserved inventory, the enterprise hub and the ISLs can insert media content into some of the reserved inventory, as illustrated by block 216. To insert the media content, the enterprise hub can request the media content related to the selected one or more spots of available inventory, receive advertising content, associate the advertising content with the selection of the one or more spots, and create a perfected log based on the unperfected log and the received advertising content (see, e.g., FIG. 4). If the media content provider does not claim reserved inventory, the enterprise hub can notify the one or more appropriate distributed media outlets, as illustrate by block 218.

Using the system 100, a media content provider may preempt previously provided media content (i.e., replace the media content with new media content) up to almost immediately prior to the scheduled broadcast of that media content. The enterprise hub can determine if the media content provider preempts the previously provided media content, as illustrated in block 220. The enterprise hub may determine if preemption has occurred by receiving preemption content or a request to preempt from the media content provider. The media content provider may send the preemption media content, as illustrated by block 222. The enterprise hub or other system 100 component can receive the preemption content and perform quality control on the preemption media content, as illustrated by block 224. The enterprise hub and/or the ISLs can insert the preemption content into the one or more distributed media outlet perfected logs, as illustrated by block 226.

Figure 3:
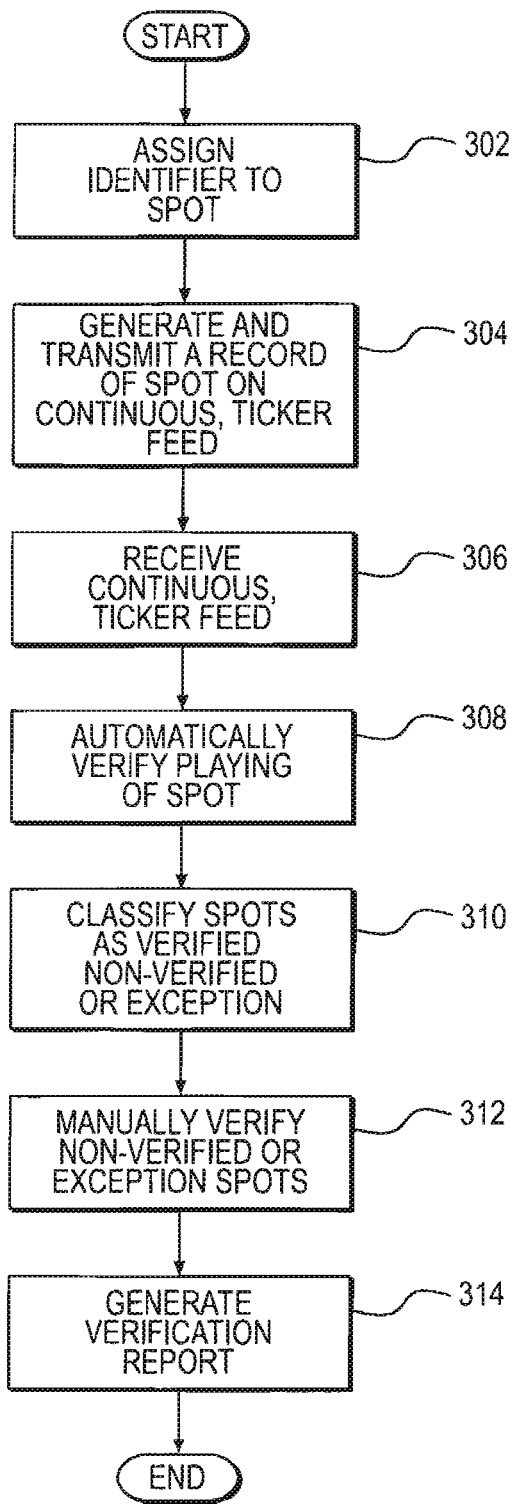
FIG. 3 is another flow diagram depicting a method for real-time insertion and reporting of media content.

As media content is broadcast, integrated media content distribution system 100 may provide a near-real time reporting of the successful or unsuccessful broadcast of the media content. Referring now to FIG. 3, a flowchart 300 illustrating reporting features of some embodiments of system 100 is provided. When enterprise hub receives media content from media content provider, enterprise hub can assign a unique identifier to the media content, as illustrated by block 302. The media content may be an advertising spot. Transaction delivery systems, including media content delivery systems and traffic and billing systems, at distributed media outlets may generate a record of the broadcast of the spot and include the record in a continuous stream of information transmitted to the enterprise hub, as illustrated in block 304.

The enterprise hub may monitor for the broadcast of the media content provided by the media content provider by receiving the continuous stream, which may be referred to as a continuous, ticker feed analogous to stock market ticker tape feeds, and analyzing the feed to determine transmission of the record corresponding to the media content, as illustrated by block 306. The enterprise hub can transmit the record for display and processing to the media content provider interface.

Enterprise hub and/media content provider interface may automatically verify if the media content broadcast as scheduled and instructed, as illustrated by block 308. The verification can be performed by comparing the record of the broadcast to the perfected log. If there are any differences between the perfected log and the record, the media content may not have broadcast as instructed.

In some embodiments, the verification process can classify the media content as verified, not verified or with exception, as illustrated by block 310. Media content may be classified as not verified if the media content did not broadcast or did not broadcast as scheduled. Media content may be classified as with exception if the media content broadcast at a different time then scheduled or if there were errors in broadcasting (e.g., not all of the media content broadcast). The media content provider may view the verification results and manually verify the non-verified or with exception media content, as illustrated in block 312. Enterprise hub and/or media content provider interface may generate and transmit, e.g., for display on the media content provider interface, a report of the verification results, as illustrated by block 314. If the media content is not verified or is classified with an exception, the system 100 can re-schedule the media content for broadcast by one or more distributed media outlets to "make good" on a requested broadcast. For example, if the media content was to be broadcast in order to receive a certain number of impressions in a certain demographic (e.g., 20-25 year old males), the media content may be re-scheduled, as described herein, at another broadcast time or times in order to achieve those impressions.

Figure 4:
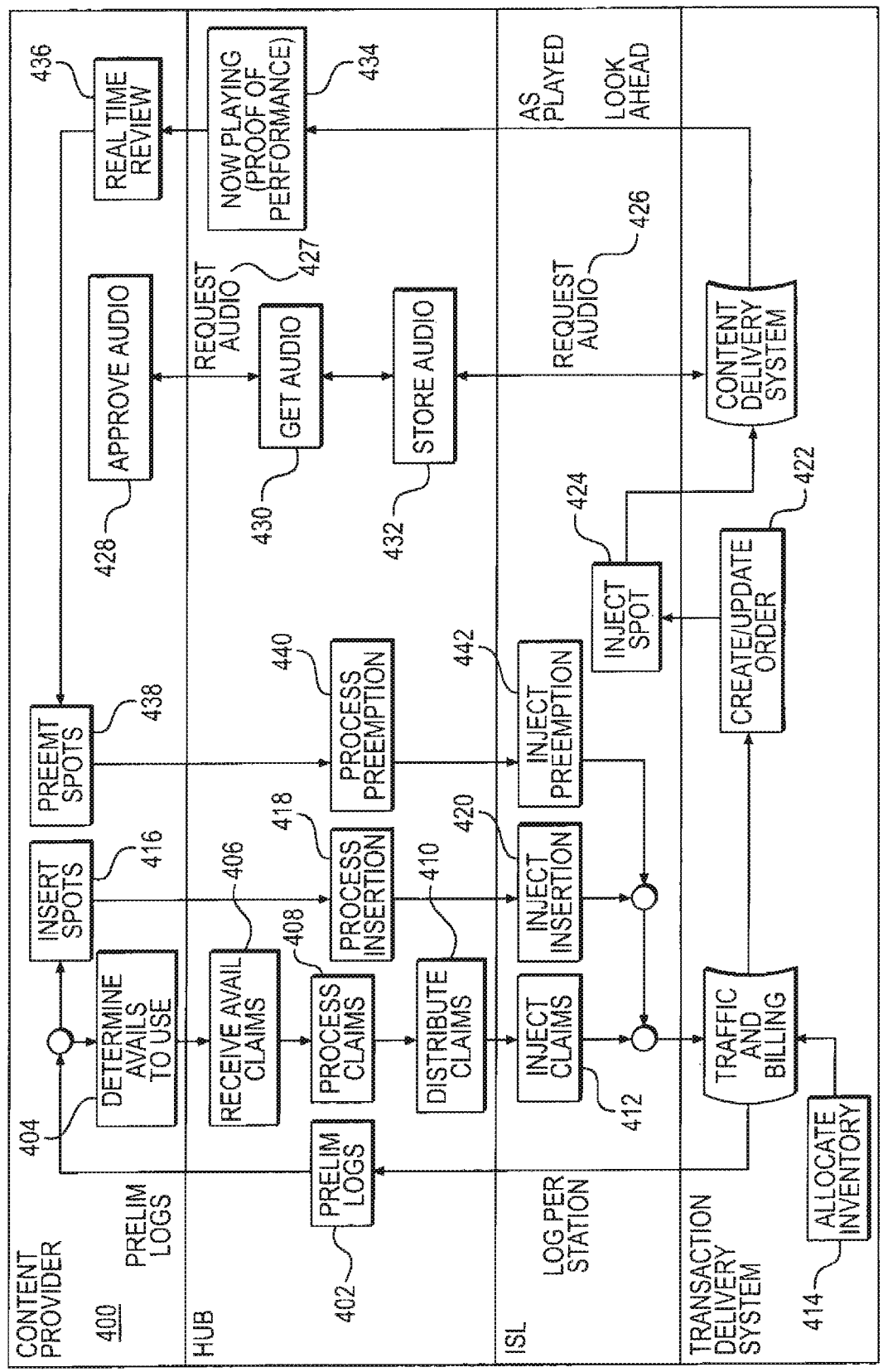
FIG. 4 is a flow diagram illustrating yet another method for real-time insertion and reporting of media content.

Referring now to FIG. 4, a flow diagram illustrating an overview of operations of embodiments of system 100 is provided. Media content providers accessing system 100 at media content provider interfaces may seek to insert media content (e.g., advertising sports) into programming (e.g., radio programming) on various distributed media outlets utilizing embodiments of method 400 shown here. Preliminary or unperfected logs can be automatically and regularly transmitted from transaction delivery systems to the media content provider interface via enterprise hub, as illustrated by block 402, can inform media content provider of avails (i.e., spots of time available for an advertising spot or other programming) for various distributed media outlets. In other words, the unperfected logs can display dedicated avails inventory available on distributed media outlets of system 100. These logs may be sent from multiple transaction delivery systems on a per distributed media outlet (e.g., per radio station) basis.

An unperfected log can show aspects of a media outlet's schedule for a day. In some embodiments, an unperfected log can show a media content provider's contracted for avails in the media outlet's schedule and the surrounding programming, or context, for the media content provider's avails. A media content provider may contract for these avails, and may chose to use its contracted avails or not use them; the surrounding programming is reserved for the media outlet's use. An unperfected log can be called "preliminary" because the unperfected log has not been updated with a media content provider's avails claims; the unperfected log can be the log sent prior to the media content provider submitting its avails claims. In embodiments, media outlets may send their "final" unperfected log at midnight, twenty four hours before the day shown in the log (the "day of play"). Media content providers may know this is the final version of the unperfected log and that the media outlet may not subsequently change the unperfected log. Media outlets may send earlier versions of the unperfected log prior to this time, and media content providers may understand that these earlier versions may change. However, utilizing these earlier versions, media content providers to anticipate what the final unperfected log may be and make initial determinations of avails claims. In embodiments, the final unperfected log may be sent at midnight, twenty-four hours before the day of play, may remain unchanged from an earlier version. On a given night on which a media outlet transmits its final unperfected log at midnight for the day of play, the media outlet may also transmit any number of unperfected logs for subsequent days (e.g., radio station transmits at 12:00 AM Monday the final unperfected log for Tuesday, and unperfected logs for Wednesday-Friday). These other non-final unperfected logs may be changed any number of times before their "final" deadline or remain unchanged.

In embodiments, media outlets transaction delivery systems can generate and maintain logs, actual or local logs, representing the media outlet's schedule for each day. The unperfected logs transmitted to system 100, as discussed above, may be copies of the local logs. The unperfected logs transmitted to system 100 can be used by media content providers to claim avails and to insert the actual media content, as discussed herein. Avail claims can be communicated to the transaction delivery systems and inserted into the local logs. On the day of play, the local log may be the actual, planned schedule of advertising spots, or spot playlist, for the media outlet, including spots ordered and scheduled for media content providers, or others, and local market spots. This playlist may be merged with the other programming (e.g., songs, talk show, new, etc.) to form the media outlet playlist for the day.

With continued reference to FIG. 4, media content provider can use media content provider interface to view unperfected logs, listed avails and other log information. Media content provider may determine what avails to use based on this information and enter the selected or claimed avails into media content provider interface, as illustrated by block 404. Media content provider interface may transmit this information, the avails claims (e.g., the contractually-reserved spaces in the distributed media outlet schedule for which media content provider wishes to submit media content (e.g., an advertising spot)), to enterprise hub. In embodiments, the transmission of avails claims may occur sometime almost immediately after midnight, i.e., almost immediately after the final unperfected log is sent (e.g., for Tuesday day of play, final unperfected log is sent at 12:00 AM Monday morning and avails claims submitted by 12:05 AM Monday morning). For example, media content provider may enter and transmit an identifier for the avails it wishes to claim using media content provider interface. In an embodiment, media content provider can use the media content provider interface to edit the unperfected log, insert the media content provider's ID into the spots media content provider wishes to claim and transmit or upload the edited unperfected log.

In embodiments, enterprise hub can receive the avail claims (e.g., the uploaded log), as illustrated by 406, and can process the avail claims, as illustrated by block 408. When processing avail claims, enterprise hub may create a revised unperfected log for each distributed media outlet or market in which media content provider is submitting an avail claim. Enterprise hub can insert avail claims into the log for each distributed media outlet or market to create preliminary revised log. In other words, in place of avails shown in unperfected logs, enterprise hub can insert media outlet provider's claims. Enterprise hub may receive claims (e.g., uploaded logs) from multiple media content providers and may process all uploaded logs together to form one preliminary revised log for each distributed media outlet or market.

After processing, enterprise hub can distribute the avail claims to various ISLs for distributed media outlets in which media content provider has submitted an avail claim, as illustrated by block 410. The ISLs can receive the claims and inject the claims into actual or local logs of distributed media outlets media content delivery and traffic and billing systems, block 412. These transaction delivery systems can allocate local inventory into the actual logs, block 414, and receive the injected claims. These transaction delivery systems can update the local logs (e.g., the unperfected logs transmitted as described above) and transmit the updated logs to the media content provider interface via the enterprise hub. As noted above, these updated logs can bee sent from multiple distributed media outlet transaction delivery systems on a per media outlet (e.g., per radio station) basis.

The updated logs may include a status of the claimed avails. Consequently, media content provider interfaces can receive the updated logs from multiple distributed media outlet to which they have sent avail claims.

Media content provider interfaces can insert media content (e.g., advertising spots) utilizing the updated logs, as illustrated by block 416. In other words, media content provider interfaces can transmit instructions for media content to enterprise hub for insertion into the local logs. This typically can occur around 9:00 PM the day prior to the airing of the media content. Enterprise hub can receive and process the insertion (i.e., the instructions), as illustrated by block 418 (see, e.g., FIG. 3). Enterprise hub can determine to which ISL(s) to transmit the instructions. ISL can receive and inject the insertion (i.e., the instructions) into the appropriate distributed media outlet(s) transaction delivery systems, as illustrated by block 420. Transaction delivery systems can create or update an order, as illustrated by block 422. An order may be a standing order or placeholder for media content. Media content providers can indicate they want to place media content (e.g., an advertising spot) in a certain time slot, e.g., 24 hours before the slot. By a certain time of day, media content providers can provide the media content (e.g., the advertising spot). In some embodiments, up to a certain time, e.g., 15 minutes, before the slot, the medic content providers can swap out the media content for different media content (a.k.a., a "preempt"). After creating or updating the order as illustrated by block 422, transaction delivery systems can inject the media content instructions into the log, as illustrated by block 424. Traffic and billing system may transmit insertion through ISL to media content delivery system.

If a new media content, transaction delivery systems can request the media content (e.g., audio) specified in the instructions sent and in the order created, as illustrated by block 426. If the enterprise hub database does not already have the requested media content, enterprise hub can forward the request to the media content provider interface, as illustrated by block 427. Media content provider may approve and transmit the media content, as illustrated by lock 428. Enterprise hub can receive the approved media content, as illustrated by block 430, store the approved media content in the enterprise hub database for future access, as illustrated by block 432, and transmit the approved media content to the transaction delivery systems via ISL. Transaction delivery systems can receive the media content from enterprise hub via ISL. If the media content is previously played media content (e.g., a previous advertising spot), the media content may be retrieved from the storage at the enterprise hub database.

In some embodiments, transaction delivery systems can transmit a now playing record of the media content (e.g., an advertising spot) as it plays in real-time to the enterprise hub, block 434. In some embodiments, transaction delivery systems can transmit the record on system 100 as part of a continuous, ticker feed or stream of information that enterprise hub may make available for viewing on media content provider interface. The media content provider can utilize the record to perform a near real-time review and verification of the media content, as illustrated by block 436. Based on the near real-time review, a media content provider may decide to preempt media content, as illustrated by block 438. A spot preemption can insert a different spot or some other content in place of an already injected spot. Media content provider interface can transmit the preemption content to enterprise hub, which can process the pre-emption, as illustrated by block 440, and can determine to which distributed media outlet the preemption should be transmitted. Enterprise hub can forward the preemption to the appropriate ISL(s), which can inject the preemption, as illustrated by block 442, so that distributed media outlet transaction delivery systems may inject as described above. Transaction delivery system may also generate reports and conduct billing and collection for display and action through media content provider interface.

The near real time review that can provided by the continuous, ticker feed or stream of information allows near real time verification of played advertisements and automatic make good of advertisements that did not air correctly due to a failure. In embodiments, advertisements that broadcast successfully within parameters established by an order can be acknowledged and marked as verified within seconds after they play. Any failed advertisements can be acknowledged and marked as "exceptions" within seconds, and can then automatically "re-inserted" by transaction delivery systems into an appropriate future slot, e.g., through the use of the dynamic Booking Agent, see U.S. application Ser. No. 11/419,492, which is incorporated by reference. The failed spot can be re-inserted with potentially adjusted priority levels to ensure successful execution. This process utilizes a synchronous near real time communication method that then triggers business rules and scheduling algorithms to perform a once fully manual belated process.

Described below are various processes that can be performed by embodiments of system 100 along a time-line. The example described below is for media content that is a radio advertising spot. The time-line and the processes that can be performed are centered or based upon functions or processes performed by media content provider and media content provider interface. The times discussed somewhat arbitrary but are illustrative of a typical performance of embodiments of system 100. At 12:00 AM, twenty-four hours prior to day of play, enterprise hub can receive and filter station logs from distributed media outlets. As noted above, media content providers may act as advertising brokers. Distributed media outlet unfiltered logs can contain the specifics of what spots will be played when, including the identification of the advertiser for each spot. Filtering the station logs can remove the identification of the advertiser and any other information that should not be shared with media content providers. In place of advertiser identification, logs may indicate type of business advertising for each spot already placed (e.g., instead of McDonalds™, filtered log indicates "restaurant" or "fast-food restaurant"). A filtered log can be transmitted to media content provider interface for display to media content provider. Sometime immediately after 12:00 AM, twenty-four hours prior to day of play, media content provider can make a final determination of which spots to claim and can transmit claimed spots to enterprise hub. Typically, this occurs by 12:05 AM day prior to day of play. Enterprise hub can inject claimed spots, transmitting the claimed spots to the appropriate media outlet transaction delivery systems. Media outlet transaction delivery systems can receive and register the claimed block or blocks and may release the unclaimed blocks to local market for local market advertising.

Sometime later, typically prior to and around 09:00 PM day prior to day of play, media content provider can inject spots and determine spot details for each of its spots, including audio content and transmits spot metadata using media content provider interface. Enterprise hub may receive and transform the spot metadata (i.e., the instructions for broadcasting the spot) and the audio content for the spot. The media content provider typically uses a particular metadata format; the enterprise hub transforming transforms the media content provider formatted metadata to a format distributed media outlet transaction delivery systems can use. Enterprise hub can transmit spot metadata (the instructions for broadcasting) and audio content to distributed media outlets. In the example here, enterprise hub can transmit transformed spot metadata, e.g., via ISL, to a traffic and billing system, which can create the details of the media content provider's orders for avails, i.e., "order lines", and transmit transformed spot metadata and audio content to the media content (i.e., audio) delivery system. The media content delivery system can automatically places the spot in the media content delivery system planned playlist for future play based on processing the spot metadata (i.e., processing the instructions for broadcasting). These automatic functions can be performed for each of media content provider's claimed avails prior to midnight day of play. These functions can be performed iteratively as theses functions are repeated for as many spots and as many stations that media content provider has placed claims.

These automatic functions may also be repeated shortly before airing of a spot, for example, just prior to 15 minutes before play time. As above, media content provider can determine spot details and transmits spot metadata (i.e., instructions for broadcasting the advertising spot), in this case, changing the spot details and metadata. Enterprise hub may receive and transform the spot metadata and the audio content. Enterprise hub may transmit spot metadata and audio content to distributed media outlet delivery systems. Here, distributed media outlet traffic and billing system can create or change order lines (depending on whether new spot or spot preemption (replacement spot) and the media content delivery system can place the spot in the planned playlist. Media content provider can change or submit a new advertising sport (or other media outlet) very shortly before the scheduled broadcasting time, e.g., up to 15 minutes prior to broadcasting time (time can be set closer to broadcasting time—15 minutes allows sufficient margin of error to avoid potential problems—e.g., network congestion, communication problems or failures, corrupted files, etc.). At broadcasting time, distributed media outlet media content delivery system can play spot.

As will be appreciated, some embodiments may be embodied as a system, method or computer program product. Accordingly, some embodiments may take the form of an entirely hardware embodiment, an entirely software embodiment (including firmware, resident software, microcode, etc.) or a combination of software and hardware aspects that may all generally be referred to herein as a "circuit," "module" or "system." Furthermore, some embodiments may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device.

In fact, the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

The computer-usable medium may facilitate the propagation of data signals with the computer-usable program code embodied therewith, either in baseband or as part of a carrier wave. The computer usable program code may be transmitted using any appropriate medium, including but not limited to wireless, wireline, optical fiber cable, RF, etc. Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). Embodiments are described with reference to flowchart illustrations and/or block diagrams of methods, apparatus (systems) and computer program products.

It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The corresponding structures, materials, acts, and equivalents of all means or step plus function elements in the claims below are intended to include any structure, material, or act for performing the function in combination with other claimed elements as specifically claimed. The description has been presented for purposes of illustration and description, but is not intended to be exhaustive or limited to the form disclosed. Many modifications and variations will be apparent to those of ordinary skill in the art without departing from the scope and spirit of this technology. The embodiments were chosen and described in order to best explain the principles and the practical application, and to enable others of ordinary skill in the art to understand various embodiments with various modifications as are suited to particular uses contemplated.

The invention claimed is:

1. A method for use in a media distribution system including an enterprise hub and a plurality of media outlets, the method comprises:
   receiving media content at the enterprise hub from the plurality of media outlets via a communication network;
   assigning, by the enterprise hub, a unique identifier to the media content;
   receiving at the enterprise hub, from the plurality of media outlets via the communication network, a record of broadcast of the media content on a continuous ticker feed;
   analyzing the continuous ticker feed to detect the unique identifier; automatically verifying if the media content broadcast as scheduled;
   classifying the media content broadcast; and
   generating and transmitting to at least a provider of the media content, from the plurality of media outlets, a displayable report of the classification of the media content broadcast.

2. The method of claim 1, wherein the media content includes an advertising spot.

3. The method of claim 1, wherein the automatically verifying if the media content broadcast as scheduled is performed by comparing the record of broadcast against a perfected media station log.

4. The method of claim 1, wherein the classification of the media content includes classifications including: verified, non-verified or with exception.

5. The method of claim 4, wherein the classification of non-verified includes the media content not broadcasting or the media content not broadcasting as scheduled.

6. The method of claim 4, wherein the classification of with exception includes the media content broadcasting at a time different than scheduled or there were errors in the broadcast.

7. The method of claim 6, wherein the errors in the broadcast include less than all of the media content being broadcast.

8. The method of claim 1 further comprises rescheduling broadcasting the media content for classifications of not verified or with exception.

9. An apparatus comprises:
   a processor;
   memory operably coupled to the processor;
   a program of instructions configured to be stored in the memory and executed by the processor, the program of instructions including:
   at least one instruction configured to receive, from a plurality of media outlets via a communication network, media content;
   at least one instruction configured to assign a unique identifier to the media content;
   at least one instruction configured to receive, from the plurality of media outlets via the communication network, a record of broadcast of the media content on a continuous ticker feed;
   at least one instruction configured to analyze the continuous ticker feed to detect the unique identifier;
   at least one instruction configured to automatically verify if the media content broadcast as scheduled; at least one instruction configured to classify the media content broadcast; and
   at least one instruction configured to generate and transmit to at least a provider of the media content, from the plurality of media outlets, a displayable report of the classification of the media content broadcast.

10. The apparatus of claim 9, wherein the media content includes an advertising spot.

11. The apparatus of claim 9, wherein the automatically verifying if the media content broadcast as scheduled is performed by comparing the record of broadcast against a perfected media station log.

12. The apparatus of claim 9, wherein the classifying the media content broadcast includes classifications: verified, non-verified or with exception.

13. The apparatus of claim 12, wherein the classification of non-verified includes the media content not broadcasting or the media content not broadcasting as scheduled.

14. The apparatus of claim 12, wherein the classification of with exception includes the media content broadcasting at a time different than scheduled or there were errors in the broadcast.

15. The apparatus of claim 14, wherein the errors in the broadcast includes less than all of the media content being broadcast.

16. The apparatus of claim 9 further comprises at least one instruction configured to reschedule broadcasting the media content for classifications of not verified or with exception.

17. A distributed media content enterprise hub comprising:
   a processor;
   memory operably coupled to the processor;
   a program of instructions configured to be stored in the memory and executed by the processor, the program of instructions including:
   at least one instruction configured to receive, from a plurality of media outlets via a communication network, media content;
   at least one instruction configured to assign a unique identifier to the media content;
   at least one instruction configured to receive, from the plurality of media outlets via the communication network, a record of broadcast of the media content on a continuous ticker feed;
   at least one instruction configured to analyze the continuous ticker feed to detect the unique identifier;
   at least one instruction configured to automatically verify if the media content broadcast as scheduled;
   at least one instruction configured to classify the media content broadcast as verified, non-verified or an exception; and
   at least one instruction configured to generate and transmit to at least a provider of the media content, from the plurality of media outlets, a displayable report of the classification of the media content broadcast.

18. The distributed media content enterprise hub of claim 17, wherein the classification of non-verified includes the media content not broadcasting or the media content not broadcasting as scheduled.

19. The distributed media content enterprise hub of claim 17, wherein the classification of with exception includes the media content broadcasting at a time different than scheduled or there were errors in the broadcast.

20. The distributed media content enterprise hub of claim 17 further comprises at least one instruction configured to reschedule broadcasting the media content for classifications of not verified or with exception.

* * * * *